United States Patent
Wang et al.

(10) Patent No.: US 7,039,761 B2
(45) Date of Patent: May 2, 2006

(54) METHODOLOGY FOR PERFORMING CACHING PROCEDURES IN AN ELECTRONIC NETWORK

(75) Inventors: Annie Wang, San Jose, CA (US); Steven Kennedy, Mountain View, CA (US); Sho San Kou, Saratoga, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 430 days.

(21) Appl. No.: 10/638,749

(22) Filed: Aug. 11, 2003

(65) Prior Publication Data

US 2005/0038864 A1 Feb. 17, 2005

(51) Int. Cl.
*G06F 12/00* (2006.01)
(52) U.S. Cl. .......................... 711/118; 711/3; 711/154; 709/203; 709/213; 379/88.13; 379/88.17
(58) Field of Classification Search ................ 711/118, 711/3, 154; 709/203, 213; 379/88.13
See application file for complete search history.

(56) References Cited

U.S. PATENT DOCUMENTS

| | | | |
|---|---|---|---|
| 5,577,211 A * | 11/1996 | Annapareddy et al. | 709/232 |
| 6,195,345 B1 | 2/2001 | Kramer | 370/352 |
| 6,233,318 B1 | 5/2001 | Picard et al. | 379/88.17 |
| 6,249,808 B1 * | 6/2001 | Seshadri | 709/206 |
| 6,396,907 B1 * | 5/2002 | Didcock | 379/88.17 |
| 6,526,022 B1 * | 2/2003 | Chiu et al. | 370/229 |
| 6,816,578 B1 * | 11/2004 | Kredo et al. | 379/88.17 |
| 6,876,728 B1 * | 4/2005 | Kredo et al. | 379/88.17 |
| 6,920,478 B1 * | 7/2005 | Mendiola et al. | 709/203 |
| 6,954,792 B1 * | 10/2005 | Kang et al. | 709/229 |
| 2002/0109718 A1 * | 8/2002 | Mansour et al. | 345/744 |
| 2003/0140257 A1 * | 7/2003 | Peterka et al. | 713/201 |
| 2004/0003041 A1 * | 1/2004 | Moore et al. | 709/204 |
| 2004/0047452 A1 * | 3/2004 | Su et al. | 379/88.13 |
| 2004/0088539 A1 * | 5/2004 | Infante et al. | 713/153 |

* cited by examiner

*Primary Examiner*—Stephen C. Elmore
(74) *Attorney, Agent, or Firm*—Gregory J. Koerner; Redwood Patent Law

(57) ABSTRACT

A system for performing caching procedures in an electronic network may include a user device that communicates with a server device in the electronic network for transmitting message information to a selected buddy device in the electronic network. A messaging application of the user device may temporarily store the message information into a cache device as a cached message until a successful transmission of the cached message to the buddy device becomes possible through the server device and over the electronic network.

42 Claims, 8 Drawing Sheets

METHODOLOGY FOR PERFORMING CACHING PROCEDURES IN AN ELECTRONIC NETWORK

BACKGROUND SECTION

1. Field of the Invention

This invention relates generally to techniques for handling information in an electronic network, and relates more particularly to a methodology for performing caching procedures in an electronic network.

2. Description of the Background Art

Implementing effective methods for handling information in an electronic network is a significant consideration for designers and manufacturers of contemporary electronic devices. However, effectively handling information utilized by devices in an electronic network may create substantial challenges for system designers. For example, enhanced demands for increased device functionality and performance may require more system processing power and require additional software resources. An increase in processing or software requirements may also result in a corresponding detrimental economic impact due to increased production costs and operational inefficiencies.

Furthermore, enhanced device capability to perform various advanced network operations may provide additional benefits to a system user, but may also place increased demands on the control and management of various communication mechanisms. For example, an enhanced electronic network device that effectively handles digital image data may frequently benefit from an efficient implementation because of the large amount and complexity of the digital data involved.

Due to growing demands on system resources and substantially increasing data magnitudes, it is apparent that developing new techniques for handling information in an electronic network is a matter of concern for related electronic technologies. Therefore, for all the foregoing reasons, developing effective systems for handling information in an electronic network remains a significant consideration for designers, manufacturers, and users of contemporary electronic systems.

SUMMARY

In accordance with the present invention, a methodology for effectively performing caching procedures in an electronic network is disclosed. In one embodiment of an offline caching procedure, a user device may communicate to selected buddy devices through a server in the electronic network. A messaging application of the user device may manage the offline caching procedure to locally store a cached message whenever the user device is unable to successfully transmit messaging communications over the electronic network due to various network conditions such as the server or the electronic network being temporarily inoperable.

In practice, the messaging application may initially allow a device user to log-in to the server of the electronic network by providing various types of log-in information. The messaging application may then determine whether the server is inoperable by utilizing any appropriate means. If the messaging application determines that the server is inoperable, then the device user may determine whether to enter an offline log-in mode to thereby create and store a cached message for subsequent transmission to a selected buddy device in the electronic network. If the device user decides to log-in offline, then the device user may verify the log-in information previously entered, and may also correct any errors in the log-in information.

The messaging application may then create a new cache file for the cached message in a cache that is part of a local memory resource of the user device, and may also store the foregoing log-in information into the cache file as part of the corresponding cached message. The device user may then utilize the messaging application to create and store any other appropriate message information corresponding to the cached message into the corresponding cache file. For example, the foregoing message information may include, but is not limited to, a target destination identifier that specifies a particular buddy device in the electronic network, and may also include text message data which comprises the actual communication to be conveyed to the selected buddy device.

The messaging application may then monitor the status of the electronic network to automatically determine whether the server has become available to receive the cached message by utilizing any effective means. If the server becomes available, then the messaging application may automatically log-in to the server by utilizing the previously stored log-in information. The messaging application may then automatically retrieve and transmit the cached message to the designated buddy device through the server and the electronic network. Finally, the messaging application may automatically log-off from the server, and may also purge the cached message that was previously transmitted to the server in order to conserve memory resources in the user device.

In one embodiment of a video message caching procedure, the messaging application may temporarily store a video message to a designated cache whenever the user device is unable to currently transmit the video message to a selected buddy due to various network conditions such as the selected buddy device being offline, or being inoperable for other reasons. In the foregoing video message caching procedure, the cache may typically be implemented as part of the server, or may be a memory resource elsewhere in the electronic network.

In practice, after the device user of the user device has successfully logged-in to the server, then the messaging application may access a buddy list that may include various types of information regarding each of the buddy devices on the buddy list, including an on-line/off-line status indicator that displays whether each of the buddy devices is currently logged-in to the server. The device user may then utilize the messaging application to select a messaging buddy from among the listed buddy devices on the buddy list.

The device user may utilize the messaging application to determine whether the selected messaging buddy is available to receive a video message from the user device by using any appropriate means. For example, the device user may simply view the foregoing on-line/off-line status indicators from the buddy list. If the selected messaging buddy is not currently available to receive a video message from the user device, then the device user may utilize the messaging application to create a new cache file in the cache to temporarily store the video message.

The messaging application may also store various types of auxiliary message information into the cache file as part of the corresponding cached video message. For example, the foregoing auxiliary message information may include, but is not limited to, a video format for the video message and a storage location identifier for the video message. The device user may then utilize the messaging application to create and store the actual video message data into the corresponding cache file, and may log-off of the server when finished.

Subsequently, the selected messaging buddy may utilize a corresponding buddy device to log-in to the server by providing various types of log-in information. The server may responsively send a message notification to the buddy device regarding the cached video message that has been saved into the cache by the user device. The foregoing message notification may include any previously-stored auxiliary message information including, but not limited to, a video format and a storage location identifier for the cached video message.

The selected messaging buddy may then download the cached video message from the cache, and may subsequently view the downloaded video message on a display of the buddy device. After initially viewing the downloaded video message, the selected messaging buddy may determine whether to retain or delete the downloaded video message after it has been viewed, and may then finally instruct the buddy device to log-off of the server. The present invention therefore provides an improved methodology for performing caching procedures in an electronic network.

DETAILED DESCRIPTION

The present invention relates to an improvement in electronic information handling techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a methodology for performing caching procedures in an electronic network, and may include a user device that communicates with a server device in the electronic network for transmitting message information to a selected buddy device in the electronic network. A messaging application of the user device may temporarily store the message information into a cache device as a cached message until a successful transmission of the cached message to the buddy device becomes possible through the server device and over the electronic network.

Figure 1:
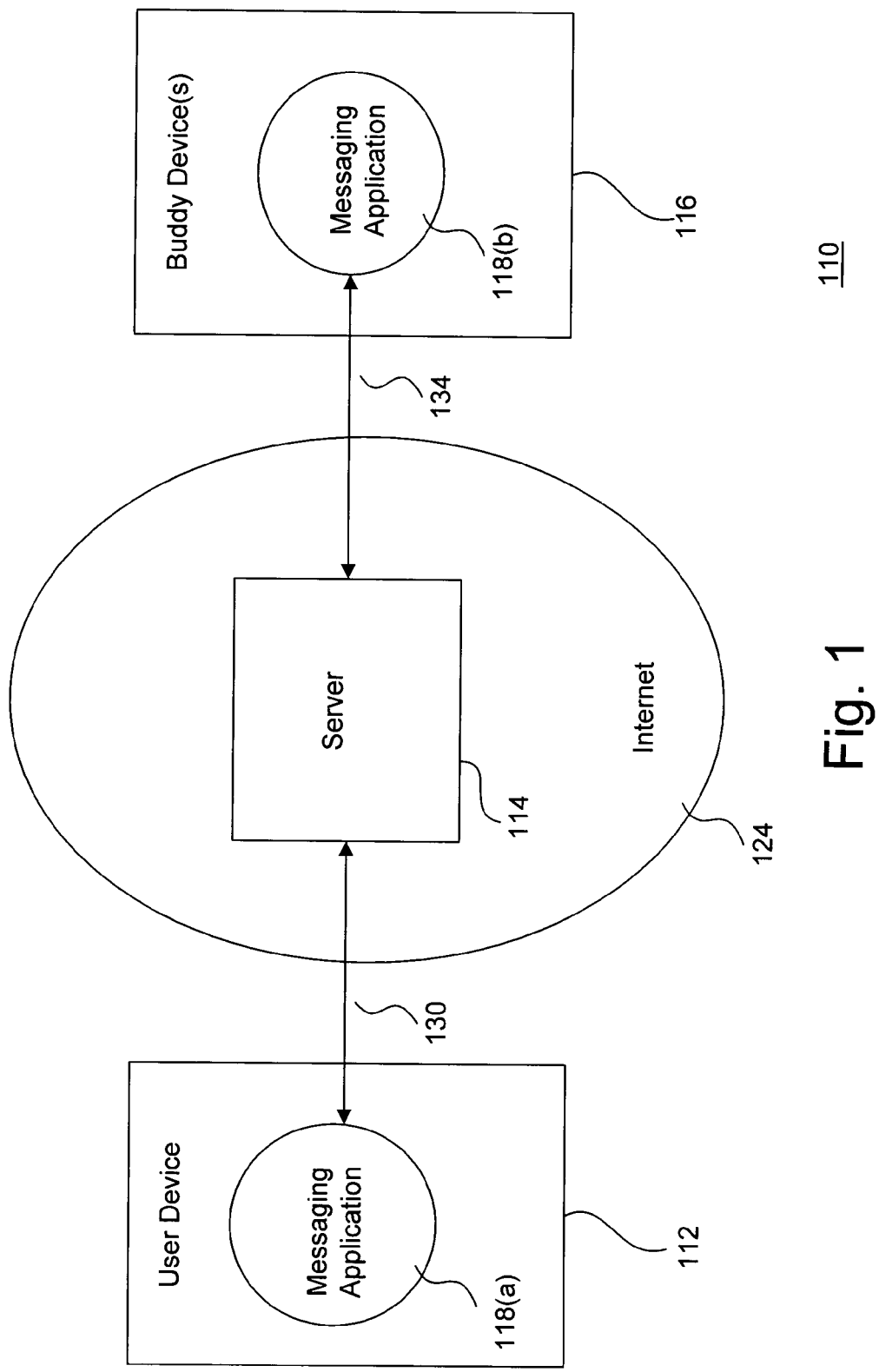
FIG. 1 is a block diagram of an electronic network, in accordance with one embodiment of the present invention.

Referring now to FIG. 1, a block diagram of an electronic network 110 is shown, in accordance with one embodiment of the present invention. In the FIG. 1 embodiment, electronic network 110 may preferably include, but is not limited to, a user device 112, a network server 114, one or more buddy device(s) 116, and an Internet 124. In alternate embodiments, electronic network 110 may readily be implemented using various components and configurations in addition to, or instead of, those discussed in conjunction with the FIG. 1 embodiment.

In the FIG. 1 embodiment, user device 112 and buddy device(s) 116 may be implemented as any type of appropriate electronic devices. For example, in certain embodiments, user device 112 and buddy device(s) 116 may be implemented as stationary or portable computer devices. In the FIG. 1 embodiment, user device 112 and buddy device(s) 116 may utilize respective messaging applications 118(a) and 118(b) to communication through Internet 124 and network server 114 via server application 120. For example, user device 112 may communicate with one or more buddy device(s) 116 by utilizing instant messaging techniques that support bi-directional messaging across electronic network 110 via network server 114. In certain embodiments, Internet 124 may be implemented as any other type of electronic network including, but not limited to, an intranet configuration. The implementation and utilization of user device 112 is further discussed below in conjunction with FIG. 2 through FIG. 8.

Figure 2:
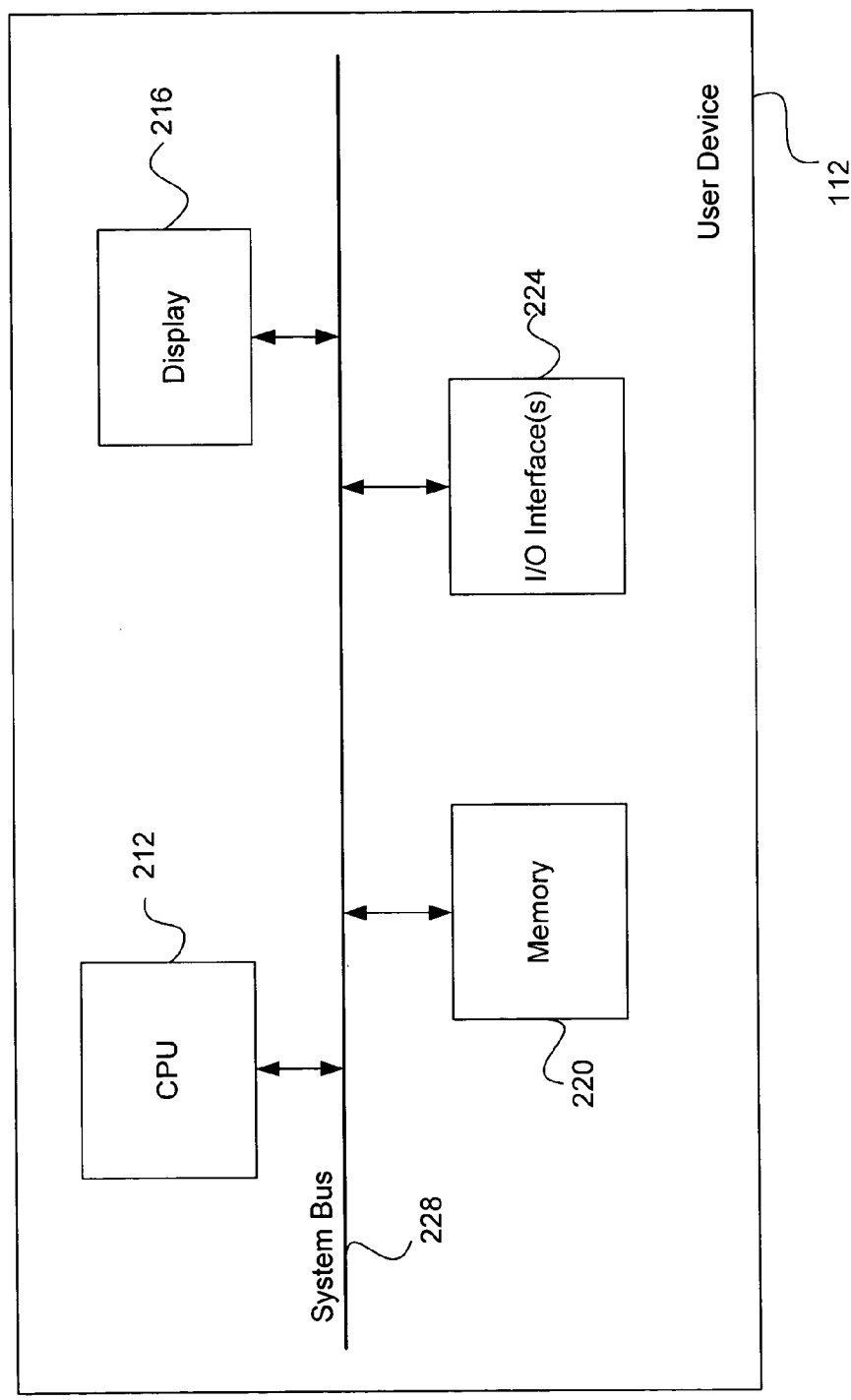
FIG. 2 is a block diagram for one embodiment of the user device of FIG. 1, in accordance with the present invention.

Referring now to FIG. 2, a block diagram for one embodiment of the FIG. 1 user device 112 is shown, in accordance with the present invention. In the FIG. 2 embodiment, user device 112 preferably may include, but is not limited to, a central processing unit (CPU) 212, a display 216, a memory 220, and one or more input/output interface(s) (I/O interface(s)) 224. The foregoing components of user device 112 may preferably be coupled to, and communicate through, a system bus 228. In alternate embodiments, user device 112 may readily be implemented using various components and configurations in addition to, or instead of, those discussed in conjunction with the FIG. 2 embodiment.

In the FIG. 2 embodiment, CPU 212 may be implemented to include any appropriate and compatible microprocessor device that preferably executes software instructions to thereby control and manage the operation of user device 112. The FIG. 2 display 216 preferably may include any effective type of display technology including a cathode-ray-tube monitor or a liquid-crystal display device with an appropriate screen for displaying various information to a device user. In the FIG. 2 embodiment, memory 220 may be implemented to include any combination of desired storage devices, including, but not limited to, read-only memory (ROM), random-access memory (RAM), and various types of non-volatile memory, such as floppy disks or hard disks. The contents and functionality of memory 220 are further discussed below in conjunction with FIG. 3.

In the FIG. 2 embodiment, I/O interface(s) 224 may preferably include one or more input and/or output interfaces to receive and/or transmit any required types of information by user device 112. I/O interface(s) 224 may include one or more means for allowing a device user to communicate with user device 112. For example, the foregoing means may include a keyboard device, a wireless remote control device, a speech-recognition module with corresponding microphone, a graphical user interface with touch-screen capability, or a selection button array mounted externally on user device 112.

The foregoing FIG. 2 embodiment is discussed above in the context of an implementation of user device 112. However, in certain embodiments of electronic network 110, various buddy device(s) 116 may be also be implemented in a manner that is the same or similar to the configuration and functionalities discussed above in conjunction with the FIG. 2 embodiment of user device 112.

Figure 3:
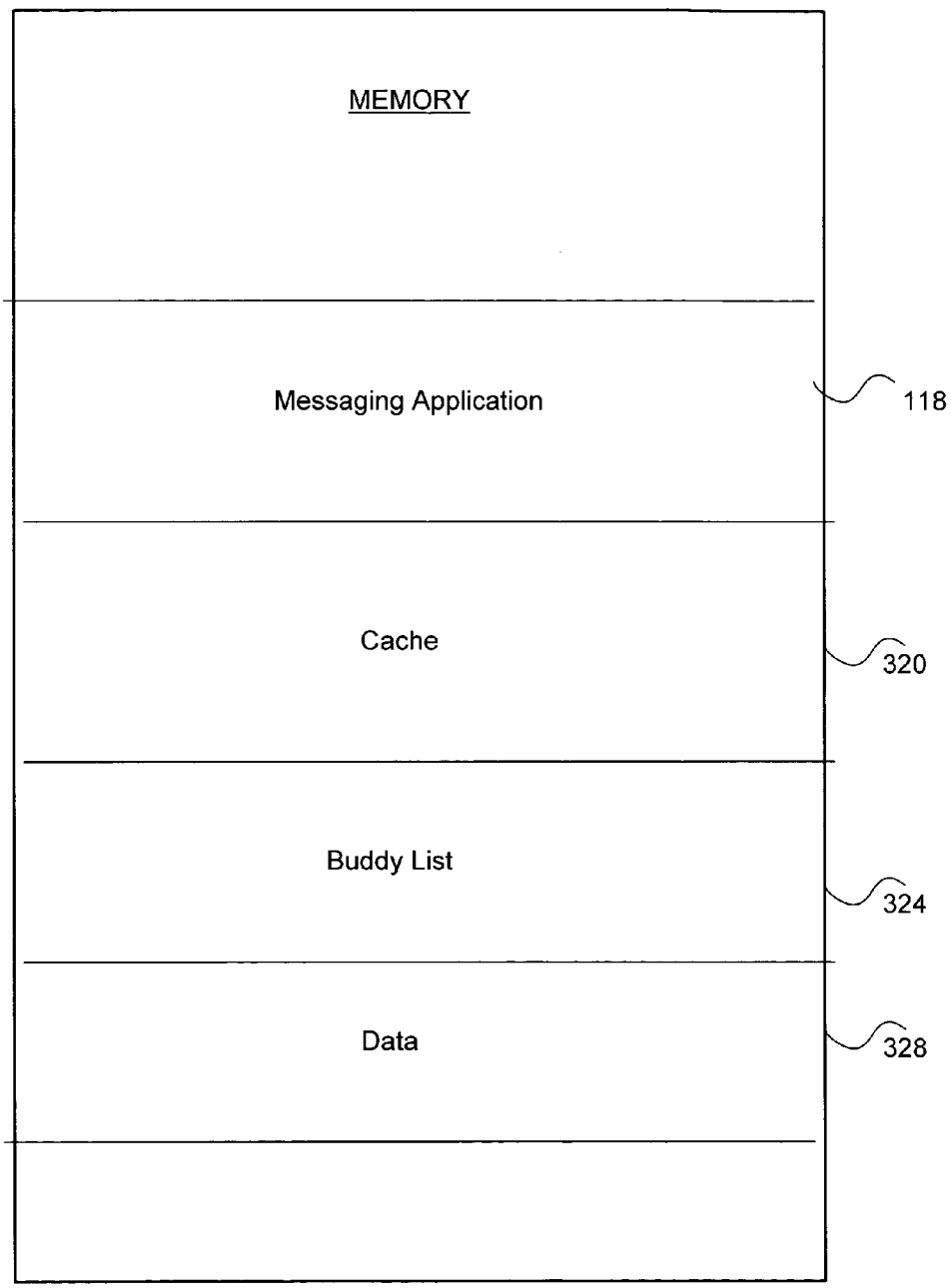
FIG. 3 is a block diagram for one embodiment of the memory of the FIG. 2 user device, in accordance with the present invention.

Referring now to FIG. 3, a block diagram for one embodiment of the FIG. 2 memory 220 is shown, in accordance with the present invention. In the FIG. 3 embodiment, memory 220 preferably includes, but is not limited to, a messaging application 118, a cache 320, a buddy list 324, and data 328. In alternate embodiments, memory 220 may readily include various other components in addition to, or instead of, those components discussed in conjunction with the FIG. 3 embodiment.

In the FIG. 3 embodiment, messaging application 118 may include program instructions that are preferably executed by CPU 212 (FIG. 2) to perform various functions and operations for user device 112. The particular nature and functionality of messaging application 118 typically varies depending upon factors such as the specific type and particular functionality of the corresponding user device 112. For example, in certain embodiments, messaging application 118 may include appropriate middleware for communicating with server 114 (FIG. 1).

In the FIG. 3 embodiment, user device 112 may advantageously utilize cache 320 to temporarily store various types of messages and other information for transmission across electronic network 110. In the FIG. 3 embodiment, cache 320 is shown as being implemented locally as part of memory 220 of user device 112. However, in other appropriate embodiments, cache 320 may also be implemented as part of server 114 or elsewhere in electronic network 110. Several embodiments and corresponding uses for the foregoing cache 320 are further discussed below in conjunction with FIG. 4 through FIG. 8.

In the FIG. 3 embodiment, buddy list 324 may include an updateable listing of selected buddy devices 116 (FIG. 1) that have been specifically designated as communication partners for user device 112. In the FIG. 3 embodiment, data 328 may include any appropriate information for use by user device 112. For example, data 328 may include, but is not limited to, locally-stored user preferences for use by messaging application 118, and a dynamically updateable data model that flexibly caches various status changes to user device 112 or electronic network 110

The foregoing FIG. 3 embodiment is discussed above in the context of an implementation of memory 220 for user device 112. However, in certain embodiments of electronic network 110, memory resources of various buddy device(s) 116 may be also be implemented in a manner that is the same or similar to the configuration and functionalities discussed above in conjunction with the FIG. 2 embodiment.

Figure 4:
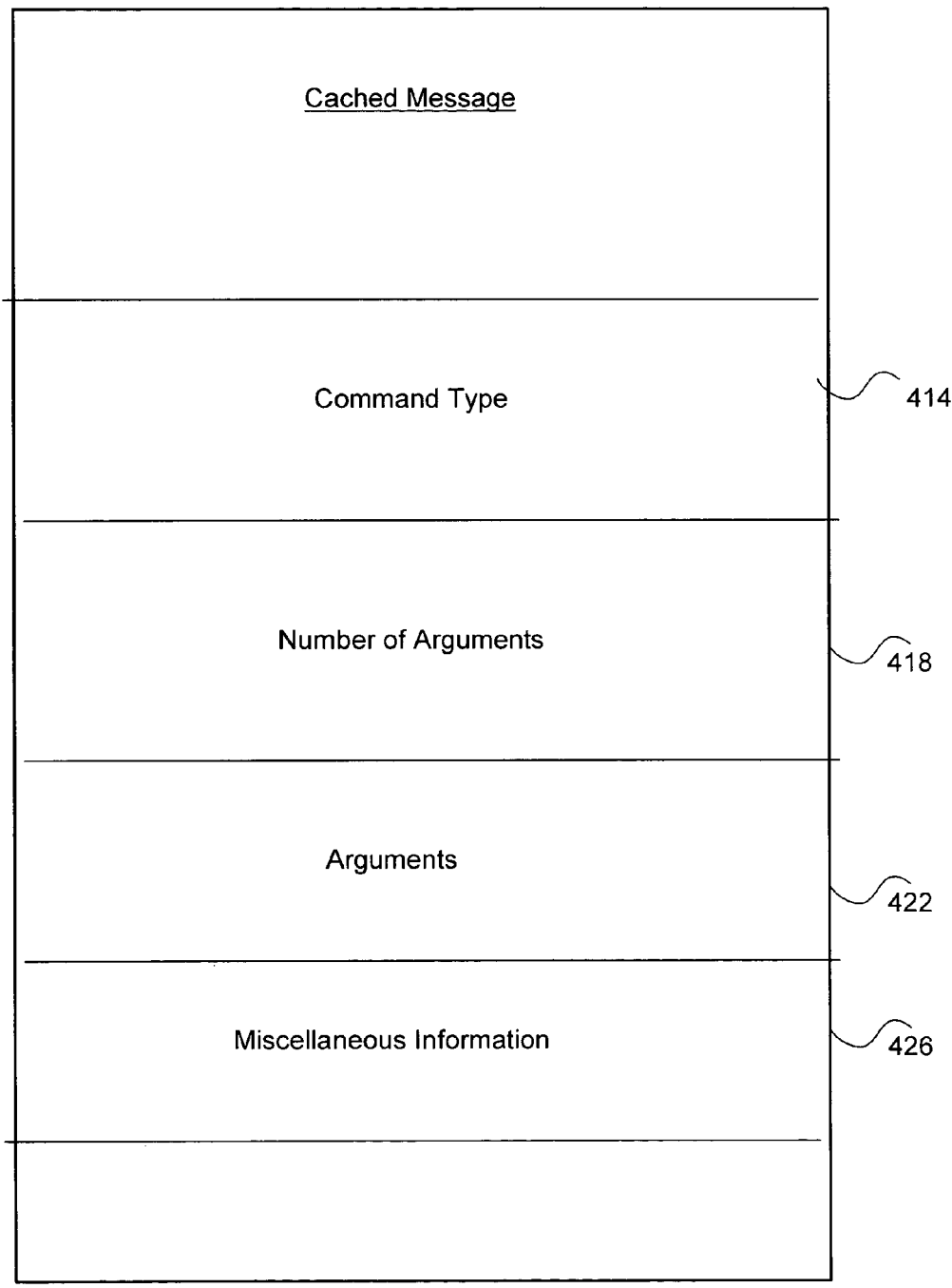
FIG. 4 is a diagram for one embodiment of a cached message, in accordance with the present invention.

Referring now to FIG. 4, a diagram for one embodiment of a cached message 410 is shown, in accordance with the present invention. In the FIG. 4 embodiment, cached message 410 may include, but is not limited to, a command type 414, a number of arguments 418, arguments 422, and miscellaneous information 426. In accordance with the present invention, cached message 410 may be stored by user device 112 or another entity into cache 320 or any other appropriate storage resource. In alternate embodiments, cached message 410 may readily include various other elements and functionalities in addition to, or instead of, those elements and functionalities discussed in conjunction with the FIG. 4 embodiment.

In the FIG. 4 embodiment, command type 414 may include any description identifying the type of command associated with cached message 410. For example, command type 414 may include "login" for a cached message 410 related to logging user device 112 into server 114, or may alternately include "text message" for a cached message 410 to be transmitted from user device 112 to a selected buddy device 116 in electronic network 110.

In the FIG. 4 embodiment, number of arguments 418 specifies the total number of arguments associated with a particular cached message 410. Similarly, arguments 422 may include any relevant information associated with the cached message 410. For example, if command type 414 were "login", then arguments 422 may include text information specifying a username for user device 112, a password for logging into server 114, and a server name specifying a particular server 114 in electronic network 110.

Similarly, if command type 414 were "text message", then arguments 422 may include a buddy identifier to identify a selected buddy device 116 as a target destination of cached message 410, and specific text message data which comprises the actual communication that a device user of user device 112 wishes to convey to the selected buddy device 116. Miscellaneous information 426 may include any other desired type of information for storage with cached message 410. For example, miscellaneous information may include, but is not limited to, the particular format of cached message 410 or a storage location of cached message 410.

In certain embodiments, cached message 410 may advantageously be stored under the device user's unique directory to effectively provide increased privacy for the device user in situations where other people may have access to user device 112. Furthermore, in certain embodiments, cached message 410 may have a specified lifespan to advantageously conserve memory resources. The use of a limited lifespan for cached message 410 is particularly relevant when cached message 410 includes video information that typically comprises a large amount of data. Cached message 410 may thus be automatically deleted when it have been downloaded or when the lifespan has expired. A message may be provided to the original sender of cached message 410 whenever it is automatically deleted because the lifespan has been exceeded. The utilization of cached message 410 is further discussed below in conjunction with FIGS. 5–8.

Figure 5:
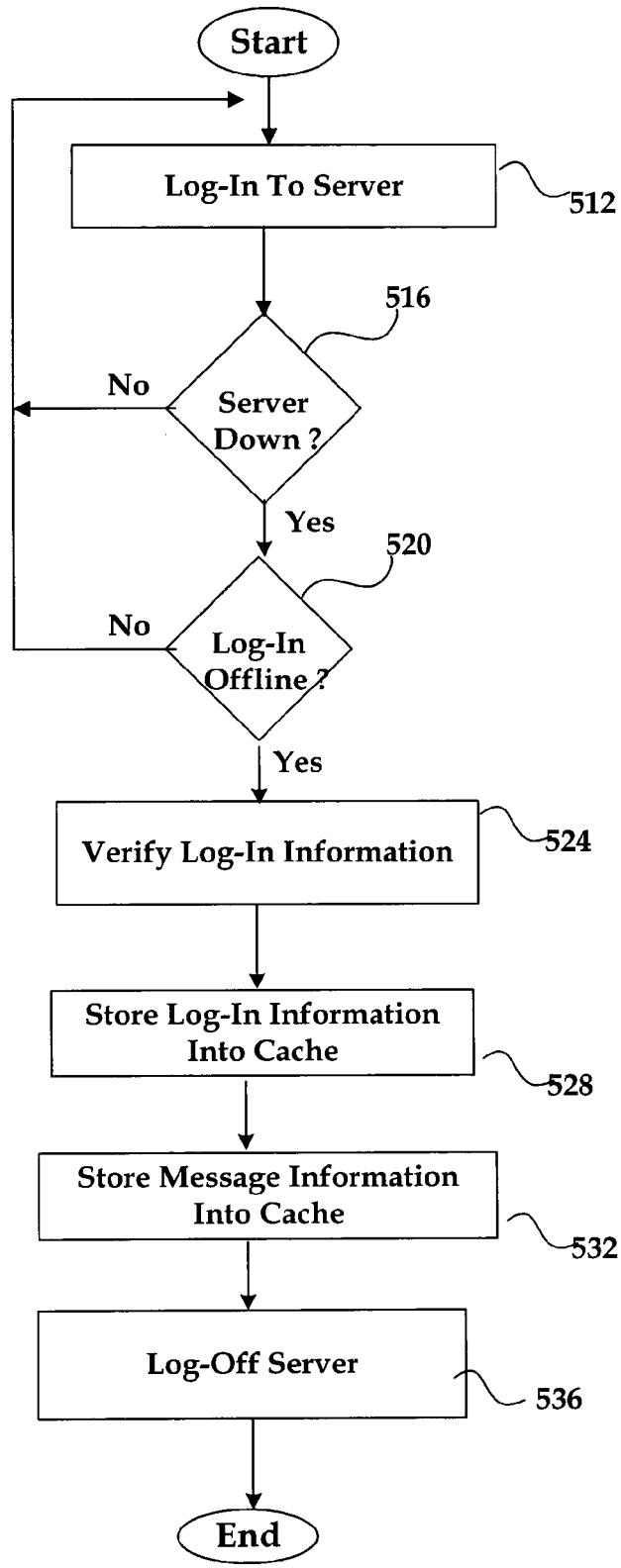
FIG. 5 is a flowchart of method steps for performing an offline caching procedure, in accordance with one embodiment of the present invention.

Referring now to FIG. 5, a flowchart of method steps for performing an offline caching procedure is shown, in accordance with one embodiment of the present invention. The FIG. 7 example is presented for purposes of illustration, and in alternate embodiments, the present invention may readily utilize various other steps and sequences than those discussed in conjunction with the FIG. 5 embodiment.

In accordance with the present invention, messaging application 118 of user device 112 may perform the FIG. 5 offline caching procedure to locally store a cached message 410 (FIG. 4) whenever user device 112 is unable to successfully transmit messaging communications over electronic network 110 due to various network conditions such as server 114 or Internet 124 being temporarily inoperable.

In the FIG. 5 embodiment, in step 512, messaging application 118 may allow a device user to initially log-in to server 114 of electronic network 110 by providing various types of log-in information. For example, the foregoing log-in information may include a log-in password, a user device identifier, a server identifier, and a resource location identifier that indicates which user account is trying to log-in to server 114. In step 516, messaging application 118 may then determine whether server 114 or Internet 124 are inoperable or "down" by utilizing any appropriate means. In certain embodiments, if either server 114 or Internet 124 are inoperable or unable to accept communications from user device 112, then messaging application 118 may generate a network problem notification on display 216 (FIG. 2) of user device 112.

If messaging application 118 determines that server 114 or Internet 124 are inoperable in foregoing step 516, then in step 520, the device user may determine whether to enter an offline log-in mode for logging-in offline to thereby create and store a cached message 410 for subsequent transmission to a selected buddy device 116 in electronic network 110. In step 520, if the device user decides to log-in offline, then in step 524, the device user may verify the log-in information initially entered in foregoing step 512, and may also correct any errors in the log-in information.

In step 528, messaging application 118 may then create a cache file for a new cached message 410 (FIG. 4), and may store the foregoing log-in information into cache 320 (FIG. 3) as part of the corresponding new cached message 410 that is being created by messaging application 118. In step 532, the device user may utilize messaging application 118 to create and store any other appropriate message information corresponding to the cached message 410 into the appropriate cache file in cache 320.

For example, the foregoing message information may include, but is not limited to, a target destination identifier that specifies a particular buddy device 116 in electronic network 110, and may also include text message data which comprises the actual communication that the device user of user device 112 wishes to convey to the target buddy device 116. In the FIG. 5 embodiment, the device user may then utilize messaging application 118 to log-off of server 118 in any effective manner. The FIG. 5 offline caching procedure may then terminate.

Figure 6:
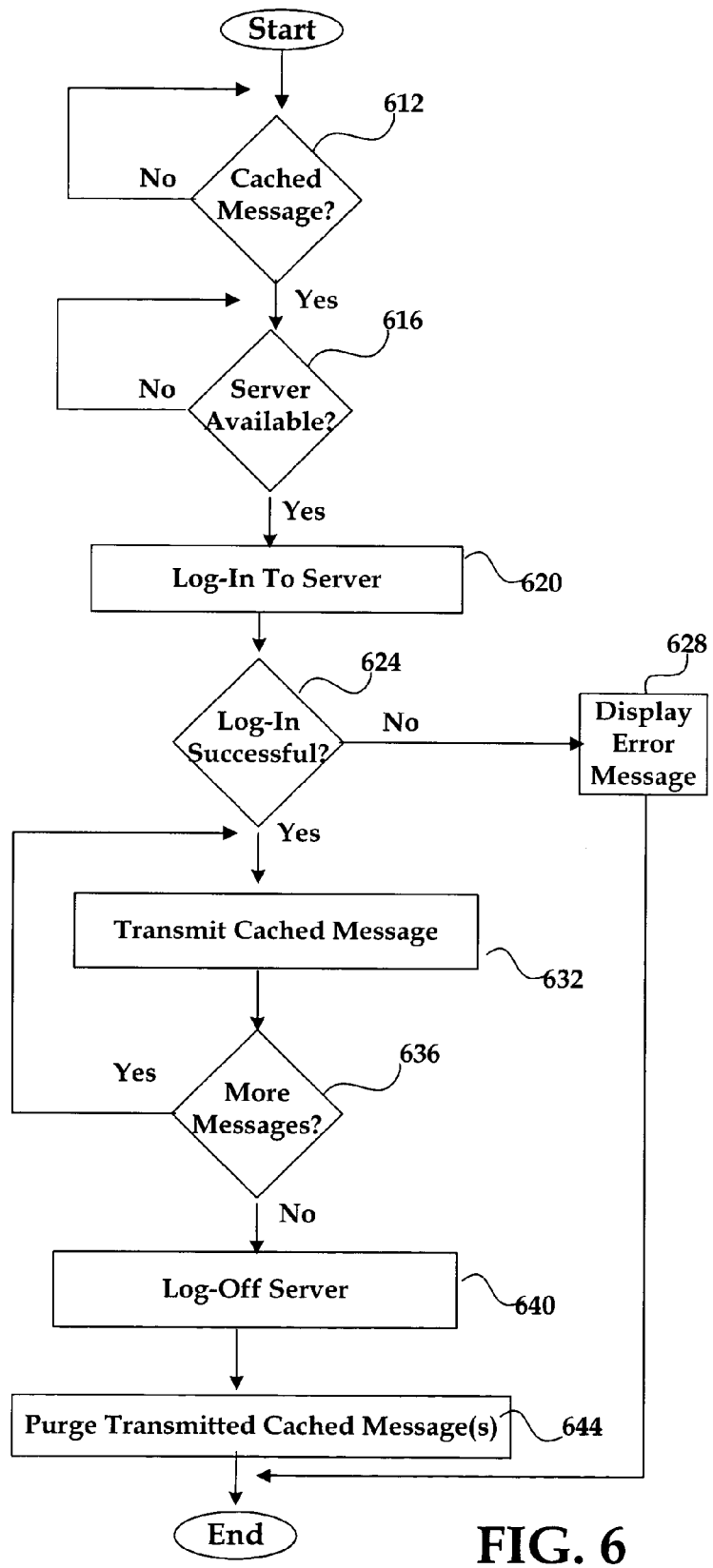
FIG. 6 is a flowchart of method steps for performing a cached message, transmission procedure in accordance with one embodiment of the present invention.

Referring now to FIG. 6, a flowchart of method steps for performing a cached message transmission procedure is shown, in accordance with one embodiment of the present invention. In accordance with one embodiment of the present invention, messaging application 118 may perform the FIG. 6 cached message transmission procedure to effectively transmit a locally cached message 410 that was created and stored as part of the foregoing offline caching procedure of FIG. 5. The FIG. 6 example is presented for purposes of illustration, and in alternate embodiments, the present invention may readily utilize various other steps and sequences than those discussed in conjunction with the FIG. 6 embodiment.

In the FIG. 6 embodiment, in step 612, messaging application 118 may determine whether any cached messages 410 are currently stored for transmission in cache 320 (FIG. 3) of memory 220. If a cached message 410 exists in foregoing step 612, then in step 616, messaging application 118 may automatically determine whether server 114 is currently available to receive the cached message 410. In the FIG. 6 embodiment, messaging application 118 may determine whether server 114 is available by utilizing any effective means. For example, in certain embodiments, messaging application 118 may periodically poll server 114 through Internet 124 to determine the current status of server 114.

If server 114 is available in foregoing step 616, then in step 620, messaging application 118 may automatically log-in to server 114 by utilizing any effective means. For example messaging application 118 may utilize the previously stored log-in information from step 528 of FIG. 5. In step 624, messaging application 118 may determine whether the foregoing log-in of user device 112 to server 114 was successful. If messaging application 118 determines that the log-in to server 114 was unsuccessful, then in step 628, messaging application 118 may display an error message on display 216 of user device 112.

However, if messaging application 118 determines that the log-in to server 114 was successful in foregoing step 624, then in step 632, messaging application 118 may automatically retrieve and transmit the cached message 410 from cache 320 to server 114 which may in turn transmit cached message 410 to the designated buddy device 116. In step 636, messaging application 118 may determine whether additional cached messages 410 remain in cache 320 for transmission. If additional cached messages 410 remain in cache 320, then messaging application 118 may sequentially retrieve and send the additional cached messages 410 to server 114 for transmission to an appropriate buddy device 116.

In the FIG. 6 embodiment, in step 640, when all cached messages 410 have been transmitted to server 114, then messaging application 118 may automatically log-off from server 114 in any effective manner. Finally, in step 644 messaging application 644 may purge or delete all cached messages 410 that were previously transmitted to server 114. The FIG. 6 cached message transmission procedure may then terminate. In certain embodiments of the present invention, messaging application 118 may automatically perform the foregoing cached message transmission procedure in the background while user device 112 efficiently performs various other processing tasks.

Figure 7:
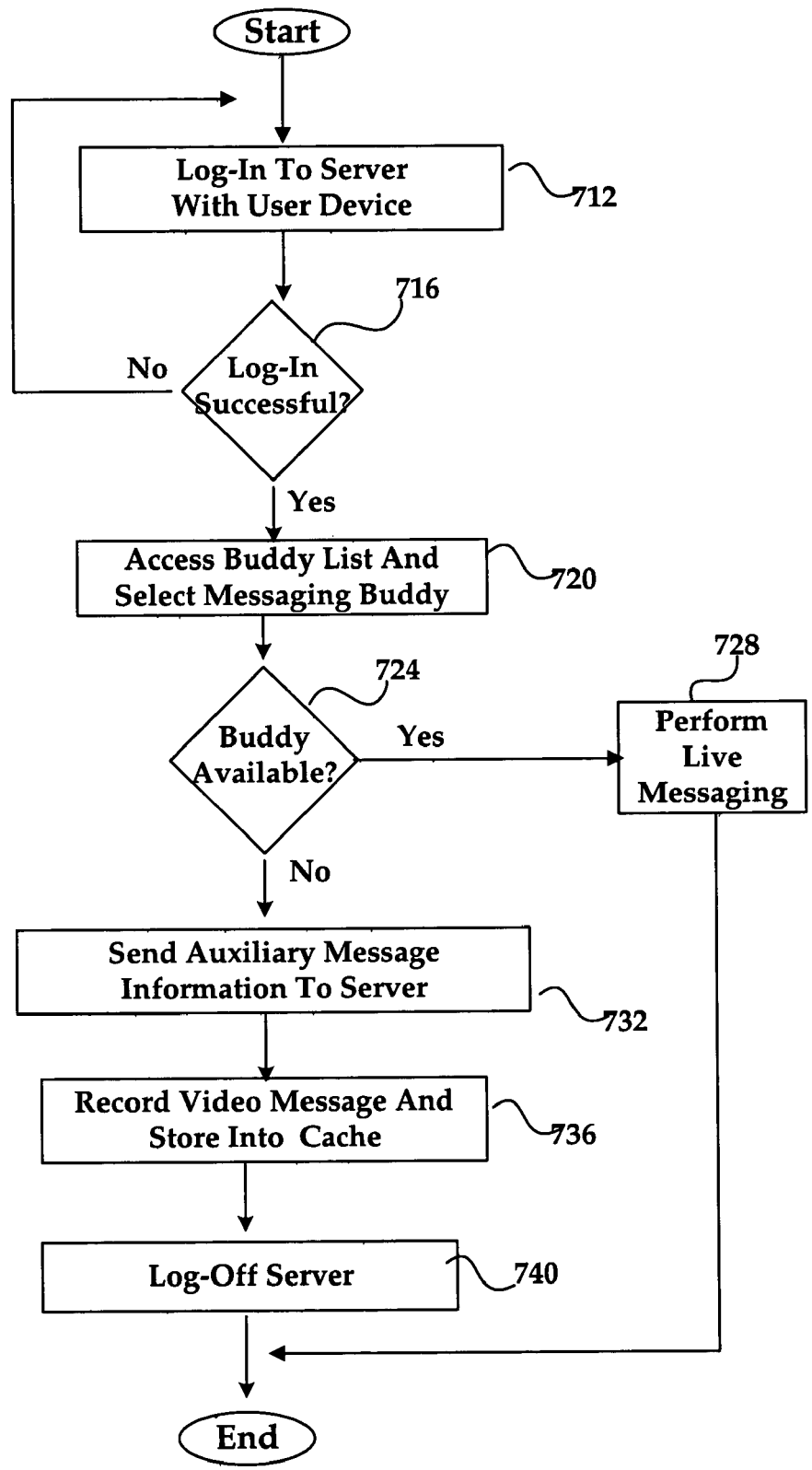
FIG. 7 is a flowchart of method steps for performing a video message caching procedure, in accordance with one embodiment of the present invention.

Referring now to FIG. 7, a flowchart of method steps for performing a video message caching procedure is shown, in accordance with one embodiment of the present invention. The FIG. 7 embodiment is presented in the context of caching video messages, however in certain embodiments, the FIG. 7 procedure may be utilized to cache any desired type of information other than video messages, including, but not limited to, text information, graphics information, and audio information. The FIG. 7 example is presented for purposes of illustration, and in alternate embodiments, the present invention may readily utilize various other steps and sequences than those discussed in conjunction with the FIG. 7 embodiment.

In accordance with the present invention, messaging application 118 of user device 112 may perform the FIG. 7 video message caching procedure to temporarily store a video message to a designated cache 320 whenever user device 112 is unable to currently transmit the video message to a selected buddy device 116 due to various network conditions such as the selected buddy device 116 being offline (not currently logged-in to server 114), or the selected buddy device 116 being inoperable for other reasons. In the FIG. 7 embodiment, cache 320 may typically be implemented as part of server 114, however, in other embodiments, cache 320 may be a memory resource anywhere in electronic network 110.

In the FIG. 7 embodiment, in step 712, messaging application 118 may allow a device user to initially log-in to server 114 of electronic network 110 by providing various types of log-in information. For example, the foregoing log-in information may include a log-in password, a user device identifier, a server identifier, and a resource location identifier that indicates which user account is trying to log-in to server 114. In step 716, messaging application 118 may then determine whether the log-in procedure of foregoing step 712 was successfully completed.

In step 720, if user device 112 has successfully logged-in to server 114, then messaging application 118 may access a buddy list 324 (FIG. 3) that may be dynamically updated at each log-in to server 114. In the FIG. 7 embodiment, buddy list 324 may include various types of information regarding each of the buddy devices 116 on buddy list 324, including an on-line/off-line status indicator that displays whether each of the buddy devices 116 is currently logged-in to server 114. The device user may then utilize messaging application 118 to select a messaging buddy from among the listed buddy devices 116 on buddy list 324.

In step 724, the device user may utilize messaging application 118 to determine whether the selected messaging buddy is available to receive a video message from user device 112 by using any appropriate means. For example, device user may simply view the foregoing on-line/off-line status indicators from buddy list 324. If the selected messaging buddy is available, then in step 728, the device user may perform a live video messaging procedure to create and transmit a live video message from user device 112 to the selected buddy device 116.

However, if the selected messaging buddy is not currently available to receive a video message from user device 112, then in step 732, the device user may utilize messaging application 118 to create a new cache file in cache 320 for the current video message. User device 112 may also send various types of auxiliary video message information corresponding to the current video message to server 114. For example, the foregoing auxiliary video message information may include, but is not limited to, a video format for the current video message and a storage location identifier for the current video message.

In step 736, the device user may then utilize messaging application 118 to create and store the actual video message data into the corresponding cache file in cache 320. Finally, in step 740, the device user may utilize messaging application 118 to log-off of server 114, and the FIG. 7 process may terminate.

Figure 8:
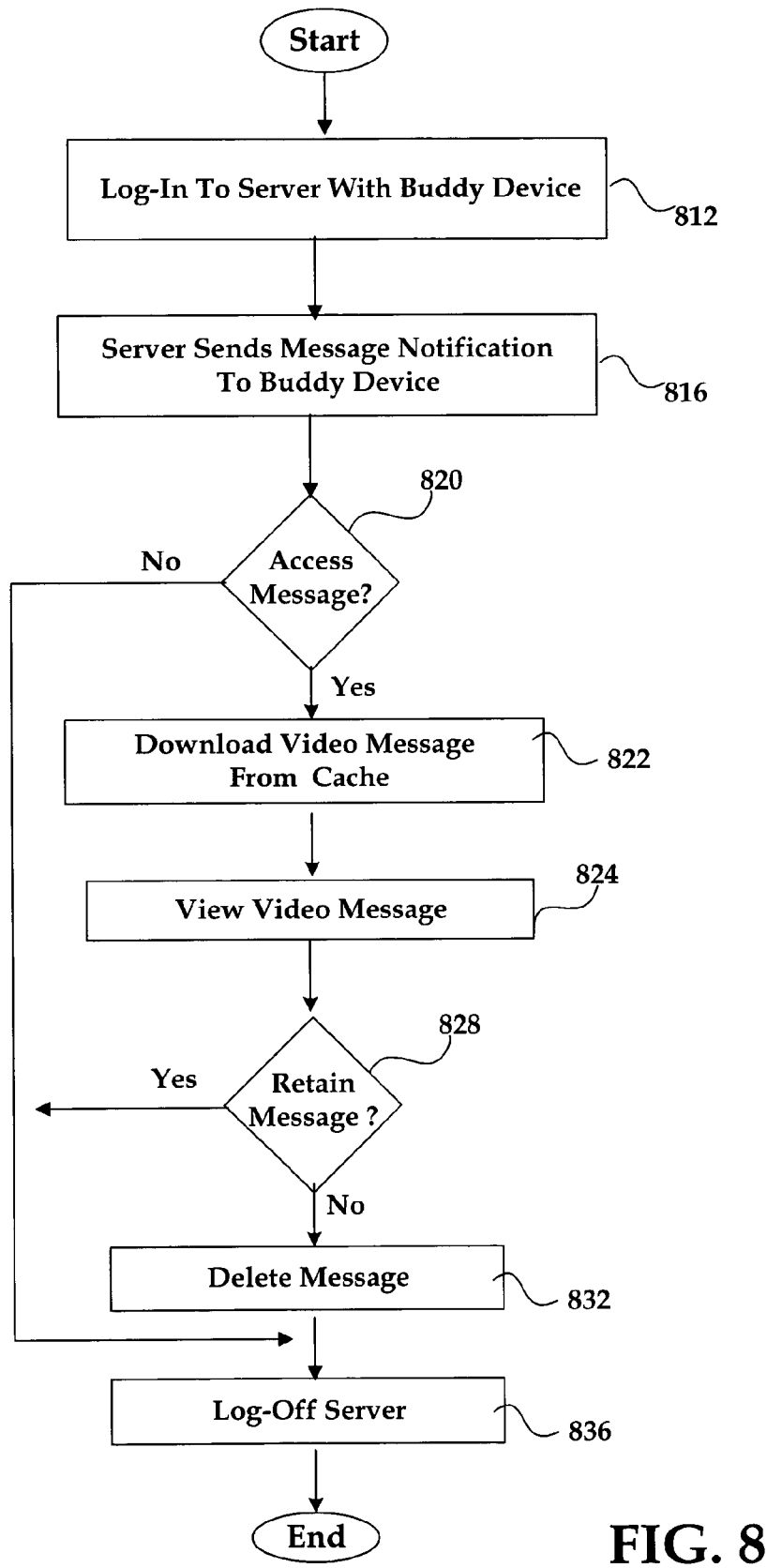
FIG. 8 is a flowchart of method steps for performing a video message download procedure, in accordance with one embodiment of the present invention.

Referring now to FIG. 8, a flowchart of method steps for performing a video message download procedure is shown, in accordance with one embodiment of the present invention. In accordance with one embodiment of the present invention, messaging application 118 may perform the FIG. 8 video message download procedure to effectively download a cached video message that was created and stored as part of the foregoing FIG. 7 video message caching procedure.

The FIG. 8 embodiment is presented in the context of cached video messages, however in certain embodiments, the FIG. 8 procedure may be utilized to cache any desired type of information other than video messages, including, but not limited to, text information, graphics information, and audio information. The FIG. 8 example is presented for purposes of illustration, and in alternate embodiments, the present invention may readily utilize various other steps and sequences than those discussed in conjunction with the FIG. 8 embodiment.

In the FIG. 8 embodiment, the selected messaging buddy of FIG. 7 may initially utilize a corresponding buddy device 116 to log-in to server 114 of electronic network 110 by providing various types of log-in information. For example, the foregoing log-in information may include a log-in password, a user device identifier, a server identifier, and a resource location identifier that indicates which user account is trying to log-in to server 114. In step 816, server 114 may responsively send a message notification to buddy device 116 regarding the cached video message that was saved into cache 320 by user device 112, as discussed above in conjunction with FIG. 7. In the FIG. 8 embodiment, the foregoing message notification may include any relevant auxiliary message information including, but not limited to, a video format and a storage location identifier for the cached video message that were initially provided to server 114 in foregoing step 732 of FIG. 7.

In step 820, the selected messaging buddy may determine whether to access the cached video message from server 114. If the selected messaging buddy decides to access the cached video message, then in steps 822 and 824, the selected messaging buddy may download the cached video message from cache 320, and may subsequently view the downloaded video message on buddy device 116.

In step 828, the selected messaging buddy may determine whether to retain the downloaded video message after it has initially been viewed. If the selected messaging buddy decides not to save the downloaded video message, then in step 832, the selected messaging buddy may instruct buddy device 116 to delete the downloaded video message. In step 836, the selected messaging buddy may then finally instruct buddy device 116 to log-off of server 116, and the FIG. 8 process may terminate.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing caching procedures in an electronic network, comprising:

a messaging application of a user device coupled to said electronic network for transmitting message information to a buddy device in said electronic network, said messaging application temporarily storing said message information into a cache device until a successful transmission of said message information to said buddy device is possible over said electronic network, a processor device coupled to said user device for controlling said messaging application to thereby perform said caching procedures in said electronic network.

2. The system of claim 1 wherein said electronic network includes a server through which said user device communicates with said buddy device.

3. The system of claim 2 wherein said messaging application temporarily stores said message information into said cache device as a cached message whenever said server or said electronic network are unable to accept said message information from said user device, said cache device being implemented as part of a local memory resource for said user device.

4. The system of claim 3 wherein a device user utilizes said messaging application to enter log-in information for logging-in to said server in said electronic network, said log-in information including a log-in password, a user device identifier, a server identifier, and a resource location identifier that specifies a user account for logging-in to said server.

5. The system of claim 4 wherein said messaging application determines that one of said server and said electronic network are unable to accept said message information from said user device, said messaging application responsively generating a network problem notification on a display of said user device.

6. The system of claim 5 wherein said device user instructs said messaging application to enter an offline log-in mode for storing said message information as said cached message into said cache device of said local memory resource.

7. The system of claim 6 wherein said device user verifies said log-in information, and corrects any errors in said log-in information.

8. The system of claim 7 wherein said messaging application creates a cache file in said cache device for storing said cached message, said messaging application storing said log-in information into said cache file as part of said cached message.

9. The system of claim 8 wherein said device user utilizes said messaging application to create and store said message information corresponding to said cached message into said cache file in said cache device, said message information including a target destination identifier that specifies said buddy device in said electronic network, and text message data for a specific communication that said device user wishes to convey to said buddy device.

10. The system of claim 3 wherein said messaging application automatically performs a network polling procedure to determine whether said server and said electronic network are available to receive said cached message from said cache device.

11. The system of claim 10 wherein said messaging application automatically performs a log-in procedure with log-in information previously stored as part of said cached message to thereby log-in said user device to said server whenever said messaging application detects that said server and said electronic network are available to receive said cached message.

12. The system of claim 11 wherein said messaging application determines that said log-in procedure was successful, said messaging application then responsively transmitting said cached message from said cache device to said buddy device through said server in said electronic network.

13. The system of claim 12 wherein said messaging application automatically logs-off of said server, said messaging application then purging said cached message from said cache device.

14. The system of claim 2 wherein said message information includes a video message, said messaging application temporarily storing said video message into said cache device as a cached video message whenever said buddy device is unable to accept said video message from said user device, said cache device being implemented as part of a memory resource for said server.

15. The system of claim 14 wherein a device user utilizes said messaging application to enter log-in information for logging-in to said server in said electronic network, said device user then selecting said buddy device from a buddy list of potential messaging target devices in said electronic network.

16. The system of claim 15 wherein said device user utilizes said messaging application to determine that said buddy device is not currently available to receive said video message, said device user then utilizing said messaging application to create a cache file in said cache device for storing said cached video message, said user device also sending auxiliary message information corresponding to said cached video message to said server, said auxiliary message information including a video format and a storage location identifier for said cached video message.

17. The system of claim 16 wherein said device user utilizes said messaging application to create and store said message information corresponding to said cached message into said cache file in said cache device, said message information including a target destination identifier that specifies said buddy device in said electronic network, and video message data for a specific video communication that said device user wishes to convey to said buddy device.

18. The system of claim 14 wherein a buddy device user utilizes said buddy device to log-in to said server in said electronic network, said server responsively sending a message notification to said buddy device regarding said cached video message that was saved into said cache device by said messaging application of said user device, said message notification including auxiliary message information previously provided to said server by said user device.

19. The system of claim 18 wherein said buddy device user utilizes said buddy device to download said cached video message from said cache device of said server, said buddy device user then viewing said cached video message upon a display of said buddy device.

20. The system of claim 19 wherein said buddy device user determines whether to delete or retain said cached video message that was downloaded from said server to said buddy device, said buddy device user then logging-off of said server in said electronic network.

21. A method for performing caching procedures in an electronic network, comprising the steps of:
transmitting message information to a buddy device in said electronic network by utilizing a messaging application of a user device coupled to said electronic network, said messaging application temporarily storing said message information into a cache device until a successful transmission of said message information to said buddy device is possible over said electronic network,
controlling said messaging application with a processor device coupled to said user device to thereby perform said caching procedures in said electronic network.

22. The method of claim 21 wherein said electronic network includes a server through which said user device communicates with said buddy device.

23. The method of claim 22 wherein said messaging application temporarily stores said message information into said cache device as a cached message whenever said server or said electronic network are unable to accept said message information from said user device, said cache device being implemented as part of a local memory resource for said user device.

24. The method of claim 23 wherein a device user utilizes said messaging application to enter log-in information for logging-in to said server in said electronic network, said log-in information including a log-in password, a user device identifier, a server identifier, and a resource location identifier that specifying a user account for logging-in to said server.

25. The method of claim 24 wherein said messaging application determines that one of said server and said electronic network are unable to accept said message information from said user device, said messaging application responsively generating a network problem notification on a display of said user device.

26. The method of claim 25 wherein said device user instructs said messaging application to enter an offline log-in mode for storing said message information as said cached message into said cache device of said local memory resource.

27. The method of claim 26 wherein said device user verifies said log-in information, and corrects any errors in said log-in information.

28. The method of claim 27 wherein said messaging application creates a cache file in said cache device for storing said cached message, said messaging application storing said log-in information into said cache file as part of said cached message.

29. The method of claim 28 wherein said device user utilizes said messaging application to create and store said message information corresponding to said cached message into said cache file in said cache device, said message information including a target destination identifier that specifies said buddy device in said electronic network, and text message data for a specific communication that said device user wishes to convey to said buddy device.

30. The method of claim 23 wherein said messaging application automatically performs a network polling procedure to determine whether said server and said electronic network are available to receive said cached message from said cache device.

31. The method of claim 30 wherein said messaging application automatically performs a log-in procedure with log-in information previously stored as part of said cached message to thereby log-in said user device to said server whenever said messaging application detects that said server and said electronic network are available to receive said cached message.

32. The method of claim 31 wherein said messaging application determines that said log-in procedure was successful, said messaging application then responsively transmitting said cached message from said cache device to said buddy device through said server in said electronic network.

33. The method of claim 32 wherein said messaging application automatically logs-off of said server, said messaging application then purging said cached message from said cache device.

34. The method of claim 22 wherein said message information includes a video message, said messaging application temporarily storing said video message into said cache device as a cached video message whenever said buddy device is unable to accept said video message from said user device, said cache device being implemented as part of a memory resource for said server.

35. The method of claim 34 wherein a device user utilizes said messaging application to enter log-in information for logging-in to said server in said electronic network, said device user then selecting said buddy device from a buddy list of potential messaging target devices in said electronic network.

36. The method of claim 35 wherein said device user utilizes said messaging application to determine that said buddy device is not currently available to receive said video message, said device user then utilizing said messaging application to create a cache file in said cache device for storing said cached video message, said user device also sending auxiliary message information corresponding to said cached video message to said server, said auxiliary message information including a video format and a storage location identifier for said cached video message.

37. The method of claim 36 wherein said device user utilizes said messaging application to create and store said message information corresponding to said cached message into said cache file in said cache device, said message information including a target destination identifier that specifies said buddy device in said electronic network, and video message data for a specific video communication that said device user wishes to convey to said buddy device.

38. The method of claim 34 wherein a buddy device user utilizes said buddy device to log-in to said server in said electronic network, said server responsively sending a message notification to said buddy device regarding said cached video message that was saved into said cache device by said messaging application of said user device, said message notification including auxiliary message information previously provided to said server by said user device.

39. The method of claim 38 wherein said buddy device user utilizes said buddy device to download said cached video message from said cache device of said server, said buddy device user then viewing said cached video message upon a display of said buddy device.

40. The method of claim 39 wherein said buddy device user determines whether to delete or retain said cached video message that was downloaded from said server to said buddy device, said buddy device user then logging-off of said server in said electronic network.

41. A computer-readable medium comprising program instructions for performing caching procedures in an electronic network, by performing the steps of:
transmitting message information to a buddy device in said electronic network by utilizing a messaging application of a user device coupled to said electronic network, said messaging application temporarily storing said message information into a cache device until a successful transmission of said message information to said buddy device is possible over said electronic network,
controlling said messaging application with a processor device coupled to said user device to thereby perform said caching procedures in said electronic network.

42. A system for performing caching procedures in an electronic network, comprising:
means for transmitting message information from a user device to a buddy device in said electronic network, said means for transmitting temporarily storing said message information into a cache device until a successful transmission of said message information to said buddy device is possible over said electronic network,
means for controlling said means for transmitting to thereby perform said caching procedures in said electronic network.

* * * * *